(12) United States Patent
Xue et al.

(10) Patent No.: US 10,744,423 B2
(45) Date of Patent: Aug. 18, 2020

(54) DEFOAMING DEVICE AND METHOD

(71) Applicant: BOE TECHNOLOGY GROUP CO., LTD., Beijing (CN)

(72) Inventors: Jinxiang Xue, Beijing (CN); Xiang Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 90 days.

(21) Appl. No.: 15/745,018

(22) PCT Filed: Aug. 25, 2017

(86) PCT No.: PCT/CN2017/099100
§ 371 (c)(1),
(2) Date: Jan. 15, 2018

(87) PCT Pub. No.: WO2018/137342
PCT Pub. Date: Aug. 2, 2018

(65) Prior Publication Data
US 2019/0366240 A1 Dec. 5, 2019

(30) Foreign Application Priority Data
Jan. 25, 2017 (CN) .......................... 2017 1 0056398

(51) Int. Cl.
*B01D 19/02* (2006.01)
*B01J 3/00* (2006.01)
(Continued)

(52) U.S. Cl.
CPC .............. *B01D 19/02* (2013.01); *B01J 3/006* (2013.01); *B01D 21/30* (2013.01); *B01J 3/04* (2013.01); *B01L 3/508* (2013.01); *B01L 2300/08* (2013.01)

(58) Field of Classification Search
None
See application file for complete search history.

(56) References Cited

U.S. PATENT DOCUMENTS 2,206,507 A * 7/1940 Kuhni .................... B01D 19/02
96/176
3,256,677 A * 6/1966 Boucher ................ B01D 19/02
95/242

(Continued)

FOREIGN PATENT DOCUMENTS

CN          104107565 A     10/2014
CN          104231289 A     12/2014
(Continued)

OTHER PUBLICATIONS

International Search Report and Written Opinion in PCT/CN2017/099100 dated Nov. 29, 2017.
1st Office Action dated Apr. 18, 2019 in CN201710056398.4.

*Primary Examiner* — Christopher P Jones
*Assistant Examiner* — Phillip Y Shao
(74) *Attorney, Agent, or Firm* — Syncoda LLC; Feng Ma

(57) ABSTRACT

Disclosed are a defoaming device and a method of defoaming. The defoaming device includes a container having a side wall, a liquid flowing platform that is placed inside the container wherein the liquid flowing platform has a substantial same shape of the side wall and the liquid flowing platform and the side wall has a gap in between, and a solution inflow part attached to the container wherein the solution inflow part is used for allowing a liquid solution to enter the container; and a lifting apparatus attached to the container, where the lifting apparatus attaches to the liquid flowing platform inside the container, and the lifting apparatus is capable of driving the liquid flowing platform to move along the side wall of the container for defoaming the liquid solution when the liquid solution passes through the gap between the liquid flowing platform and the side wall.

15 Claims, 15 Drawing Sheets

(51) Int. Cl.
   *B01D 21/30* (2006.01)
   *B01J 3/04* (2006.01)
   *B01L 3/00* (2006.01)

(56) References Cited

U.S. PATENT DOCUMENTS

| | | | | |
|---|---|---|---|---|
| 3,649,557 | A * | 3/1972 | Freedman et al. | B01D 19/02 96/177 |
| 4,373,024 | A * | 2/1983 | Hunt | B01D 19/02 435/295.1 |
| 5,612,219 | A * | 3/1997 | Rodicio | C12M 41/02 435/301.1 |
| 5,792,246 | A * | 8/1998 | Nishiguchi | B01D 19/02 95/242 |
| 2005/0230326 | A1 * | 10/2005 | Cooper | A47J 36/20 210/776 |
| 2010/0047382 | A1 * | 2/2010 | Suto | B01D 19/02 425/420 |
| 2016/0193548 | A1 | 7/2016 | Zhou et al. | |
| 2016/0244340 | A1 * | 8/2016 | Chatterjee | B01D 19/02 |
| 2017/0304747 | A1 | 10/2017 | Xiang et al. | |

FOREIGN PATENT DOCUMENTS

| | | |
|---|---|---|
| CN | 104492126 A | 4/2015 |
| CN | 105251241 A | 1/2016 |
| CN | 205649892 U | 10/2016 |
| CN | 205653153 U | 10/2016 |
| DE | 4028871 A1 | 3/1992 |
| JP | S5881403 A | 5/1983 |

* cited by examiner

Introducing a to-be-defoamed solution from an upside of a liquid flowing platform by a solution introducing part, so that the to-be-defoamed solution flows from an interval between the liquid flowing platform and a chamber wall of a vacuum container to a bottom of the vacuum container — 1501

FIG. 3

DEFOAMING DEVICE AND METHOD

CROSS-REFERENCE TO RELATED APPLICATIONS

This patent application claims the priority of the Chinese Patent Application No. 201710056398.4, entitled "DEFOAMING DEVICE AND METHOD" filed on Jan. 25, 2017, the entire contents of which are hereby incorporated by reference herein in its entirety.

TECHNICAL FIELD

The disclosure relates to the field of colloidal solution treatment, and more particularly, to a defoaming device and a method of defoaming.

BACKGROUND

In industrial production, a colloidal solution is frequently used. Due to the fact that a density of the colloidal solution is relatively large and the flowability is relatively poor, it is prone to produce foams that may be not easy to be removed from the colloidal solution. These foams may have an adverse impact on the subsequent processes. For example, in process of manufacturing a flexible substrate of a flexible display device, one of the important components of the flexible substrate is polyimides (PI) film. In order to obtain the PI film, it may be necessary to coat a PI colloidal solution onto glass by means of a coating process and then to perform high-temperature curing treatment on the glass. However, the PI colloidal solution may often contain a lot of foams. In order to guarantee the quality of the PI film and avoid the impact of deteriorated PI film on the flexible substrate, the foams therein need to be removed before the PI colloidal solution is coated onto the glass.

SUMMARY

The embodiments of the disclosure provide a defoaming device and a liquid flowing platform and a method of defoaming by using a defoaming device.

According to some aspects, a defoaming device is provided. The defoaming device may include a container including a side wall, a liquid flowing platform that is placed inside the container where the liquid flowing platform has a shape substantially fitting into a shape of the side wall, and the liquid flowing platform and the side wall has a gap in between, and a lifting apparatus (lifting component) attached to the container, where the lifting apparatus attaches to the liquid flowing platform inside the container, and the lifting apparatus is capable of driving the liquid flowing platform to move along the side wall of the container for defoaming the liquid solution when the liquid solution passes through the gap between the liquid flowing platform and the side wall.

Optionally, the lifting apparatus is capable of turning the liquid flowing platform to a substantially 90-degree inside the container while the liquid flowing platform is driven to move along the side wall.

Optionally, the defoaming device may include a vacuum pump attached to the container where the container is a contained container and has a substantial vacuum space inside the container created by the vacuum pump.

Optionally, the defoaming device may include heating wires that are attached the container, where the heating wires are capable of heating the liquid solution inside the container to a certain temperature.

Optionally, the heating wires are placed inside the liquid flowing platform.

Optionally, the defoaming device may include a solution stirrer that is placed inside the container, where the solution stirrer is capable of stirring the liquid solution inside the container for defoaming the liquid solution.

Optionally, the liquid flowing platform has a conical surface, where the liquid flowing platform has a thickness that is gradually reduced from a center of the liquid flowing platform to an edge of the liquid flowing platform, and the gap is between the edge and the side wall.

Optionally, the conical surface of the liquid flowing platform may include at least two sections, where one of the at least two sections has a wider gap than the other one of the at least two sections, and the two sections are used for defoaming different sizes of foams.

Optionally, the defoaming device may include two fixed positions for the liquid flowing platform, where two fixed positions are associated with the container and the liquid flowing platform is moved along the side wall between the two fixed positions.

Optionally, one of the two fixed positions is defined by a post that is placed inside the contained and is attached to one end of the contained, and the other one of the two fixed positions is defined by a sensor that is placed on the other end of the contained, where the sensor is capable of detecting a moving position of the liquid flowing platform and is capable of instructing the lifting apparatus to stop driving the liquid flowing platform to move.

According to some aspects, a liquid flowing platform is provided. The liquid flowing platform may include a center point and an edge, where the liquid flowing platform has a conical surface and the liquid flowing platform has a thickness that is gradually reduced from the center point of the liquid flowing platform to the edge, and the liquid flowing platform is capable of being attached inside a container, and the edge is substantially matched a side wall of the container such that a lifting apparatus attached to the container is capable of driving the liquid flowing platform to move along the side wall of the container to defoaming a liquid solution inside the container when the liquid solution passes through a gap between the edge and the side wall.

Optionally, the conical surface of the liquid flowing platform comprises at least two sections, where one of the at least two sections has a wider gap than the other one of the at least two sections, and the two sections are used for defoaming different sizes of foams.

Optionally, the liquid flowing platform is capable of being turned into a substantially 90-degree inside the container while the liquid flowing platform is driven to move along the side wall.

According to some aspects, a method of defoaming by using a defoaming device is provided. The method may include providing a container comprising a side wall, a liquid flowing platform that is placed inside the container where the liquid flowing platform has a shape substantially fitting into a shape of the side wall, and the liquid flowing platform and the side wall has a gap in between, and a solution inflow part attached to the container where the solution inflow part is used for allowing a liquid solution to enter the container; and providing a lifting apparatus attached to the container, where the lifting apparatus attaches to the liquid flowing platform inside the container, and the lifting apparatus is capable of driving the liquid flowing platform to move along the side wall of the container for defoaming the liquid solution when the liquid solution passes through the gap between the liquid flowing platform and the side wall.

The method may also include importing a liquid solution to be defoamed by the liquid flowing platform, wherein the liquid solution flows through the gap to a bottom of the container, and lifting the liquid solution by the lifting apparatus when driving the liquid flowing platform to move along the side wall of the container.

Optionally, the method may include turning the liquid flowing platform to a substantially 90-degree inside the container while the liquid flowing platform is driven to move along the side wall.

Optionally, the method may also include sealing the container, and vacuuming the container by a vacuum pump.

Optionally, the method may also include heating the liquid solution inside the container to a certain temperature by heating wires.

Optionally, the method may further include stirring the liquid solution inside the container for defoaming the liquid solution by a solution stirrer.

It should be understood that both the foregoing general description and the following detailed description are only exemplary and explanatory and are not restrictive of the disclosure.

BRIEF DESCRIPTION OF DRAWINGS

To illustrate the technical solutions of the embodiments of the disclosure more clearly, accompanying drawings used in the description of the embodiments are briefly described hereinafter. It is noted that the accompanying drawings illustrate some exemplary embodiments of the disclosure and persons of ordinary skill in the art may obtain other drawings based on these drawings without creative efforts.

FIG. 1-2 is a schematic diagram of a structure of another defoaming device provided by some embodiments of the disclosure.

FIG. 2-1 is a schematic diagram of a structure of still another defoaming device provided by some embodiments of the disclosure.

FIG. 2-2 is a schematic diagram of a structure of a liquid flowing platform provided by some embodiments of the disclosure.

FIG. 2-3 is a schematic diagram of a structure of a solution lifting component provided by some embodiments of the disclosure.

FIG. 2-4 is a schematic diagram of a structure of a bottom plate provided by some embodiments of the disclosure.

FIG. 2-5 is a top view of the bottom plate shown in FIG. 2-4.

FIG. 2-6 is a schematic diagram for a connection between a lead screw and a supporting plate of a solution lifting component.

FIG. 2-7 is a top view of the liquid flowing platform shown in FIG. 2-2.

FIG. 2-8 is a schematic diagram of a structure of another liquid flowing platform provided by some embodiments of the disclosure.

FIG. 2-9 is a schematic diagram of a structure of a pedestal provided by some embodiments of the disclosure.

FIG. 2-10 is a schematic diagram of a structure of a vacuum container provided by some embodiments of the disclosure.

FIG. 3 is a flowchart of a method for defoaming provided by some embodiments of the disclosure.

FIG. 4-1 is a flowchart of another method for defoaming provided by some embodiments of the disclosure.

FIG. 4-2 is a flowchart for lifting a to-be-defoamed solution at a bottom of a vacuum container up to an upside of a liquid flowing platform provided by some embodiments of the disclosure.

FIG. 5 illustrates a process of defoaming by using a defoaming device.

Figure 1:
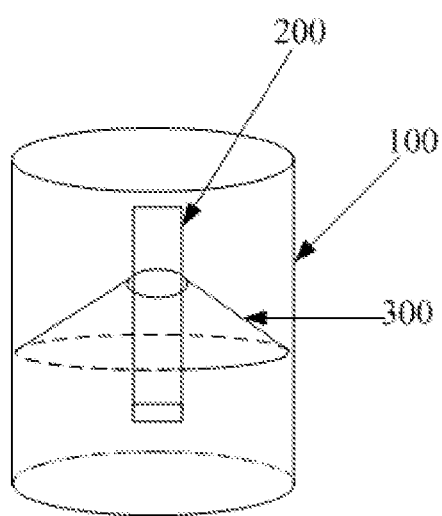
FIG. 1-1 is a schematic diagram of a structure of a defoaming device provided by some embodiments of the disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

To make the objectives, the technical solutions and the advantages of the disclosure more clear, the embodiments of the disclosure are further described below with reference to the accompanying drawings.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Sometimes, in order to remove the foams in the colloidal solution, it may be to place the colloidal solution into a vacuum chamber and stir the colloidal solution. In a stirring process, the foams in the colloidal solution may be naturally floated upward and then broken to disappear. However, this method may take about 8 hours to remove the foams every time. Thus, this process may be time-consuming and low-efficiency.

According to some embodiments of the disclosure, a defoaming device is provided. Referring to FIG. 1-1, the defoaming device may include a vacuum container 100, a solution introducing part 200 and a liquid flowing platform 300.

The liquid flowing platform 300 may be arranged in a chamber of the vacuum container 100. The liquid flowing platform 300 may have an umbrella-shaped structure. An interval may be provided between an umbrella edge of the umbrella-shaped structure and a chamber wall of the vacuum container 100.

The solution introducing part 200 may be configured to introduce a to-be-defoamed solution from an upside of the liquid flowing platform 200, so that the to-be-defoamed solution may flow through the interval, i.e., the interval between the umbrella edge of the liquid flowing platform with the umbrella-shaped structure and the chamber wall of the vacuum container, to a bottom of the vacuum container 100.

In conclusion, according to the defoaming device provided by the embodiments of the disclosure, the solution introducing part of the defoaming device can introduce the to-be-defoamed solution from the upside of the liquid flowing platform, so that the to-be-defoamed solution may flow through the interval between the liquid flowing platform and the vacuum container to the bottom of the vacuum container. The defoaming device can defoam the to-be-defoamed solution via the interval between the liquid flowing platform and the vacuum container, so that the defoaming time may be shortened and the defoaming efficiency may be improved.

Figures 1, 2:
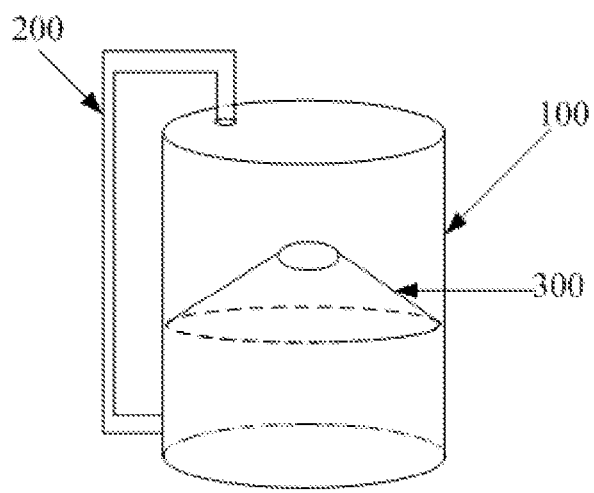

It should be noted that the solution introducing part, as shown in FIG. 1-1, may be arranged in the chamber of the vacuum container 100, or as shown in FIG. 1-2, may be arranged outside of the chamber of the vacuum container 100. Other examples of the positions of the solution introducing part are in the scope of the disclosure. When the solution introducing part 200 is arranged in the chamber of the vacuum container, the to-be-defoamed solution may enter the chamber of the vacuum container from the bottom of the vacuum container originally and may be positioned at the bottom of the vacuum container. The solution introducing part can lift the to-be-defoamed solution at the bottom of the vacuum container up to the upside of the liquid flowing platform 300. When the solution introducing part is arranged outside of the chamber of the vacuum container, the to-be-defoamed solution may enter the chamber of the vacuum container from the bottom of the vacuum container originally and may be positioned at the bottom of the vacuum container. The solution introducing part can drain out the to-be-defoamed solution at the bottom of the vacuum container, and the drained to-be-defoamed solution may enter the chamber of the vacuum container again via a top of the vacuum container and flows via the liquid flowing platform. Additionally, when the solution introducing part is arranged outside of the chamber of the vacuum container, the to-be-defoamed solution may enter the chamber of the vacuum container via the top of the vacuum container originally, and then flows through the interval between the liquid flowing platform and the vacuum container to the bottom of the vacuum container. And the to-be-defoamed solution at the bottom of the vacuum container may be introduced from the upside of the liquid flowing platform by the solution introducing part.

According to the embodiments of the disclosure, another defoaming device is provided. Referring to FIG. 2-1, the defoaming device may include a vacuum container 100, a solution introducing part, a liquid flowing platform 300 and a solution stirrer 400.

The liquid flowing platform 300 may be arranged in a chamber of the vacuum container 100. The liquid flowing platform 300 may have an umbrella-shaped structure. An interval may be provided between an umbrella edge of the umbrella-shaped structure and a chamber wall of the vacuum container 100.

The solution stirrer 400 may be positioned at a bottom of the vacuum container 100.

The solution introducing part may be configured to introduce a to-be-defoamed solution from an upside of the liquid flowing platform 300, so that the to-be-defoamed solution may flow through the interval, i.e., the interval between the umbrella edge of the liquid flowing platform with the umbrella-shaped structure and the chamber wall of the vacuum container, to the bottom of the vacuum container 100 to be stirred by the solution stirrer 400. The solution stirrer may stir the to-be-defoamed solution, so that the stability of small foams inside the to-be-defoamed solution can be reduced, and the foams are promoted to move up.

In the embodiments of the disclosure, the to-be-defoamed solution may be a colloidal solution, for example, a PI colloidal solution.

Optionally, as shown in FIG. 2-1, the solution introducing part may include a solution lifting component 210 and a control component 220. The solution lifting component 210 may be arranged in the chamber of the vacuum container 100. The solution lifting component 210 may be connected to the control component 220.

As shown in FIG. 2-2, the liquid flowing platform 300 may be provided with a through hole 310. The solution lifting component 210 shown in FIG. 2-1 may pass through the through hole 310. The solution lifting component can move along a height direction of the through hole 310, i.e., a direction indicated by u in FIG. 2-2 or a direction opposite to that, under the control of the control component 220 shown in FIG. 2-1, so that the to-be-defoamed solution at the bottom of the vacuum container 100 shown in FIG. 2-1 may be lifted up to the upside of the liquid flowing platform 300.

Figures 1, 2:
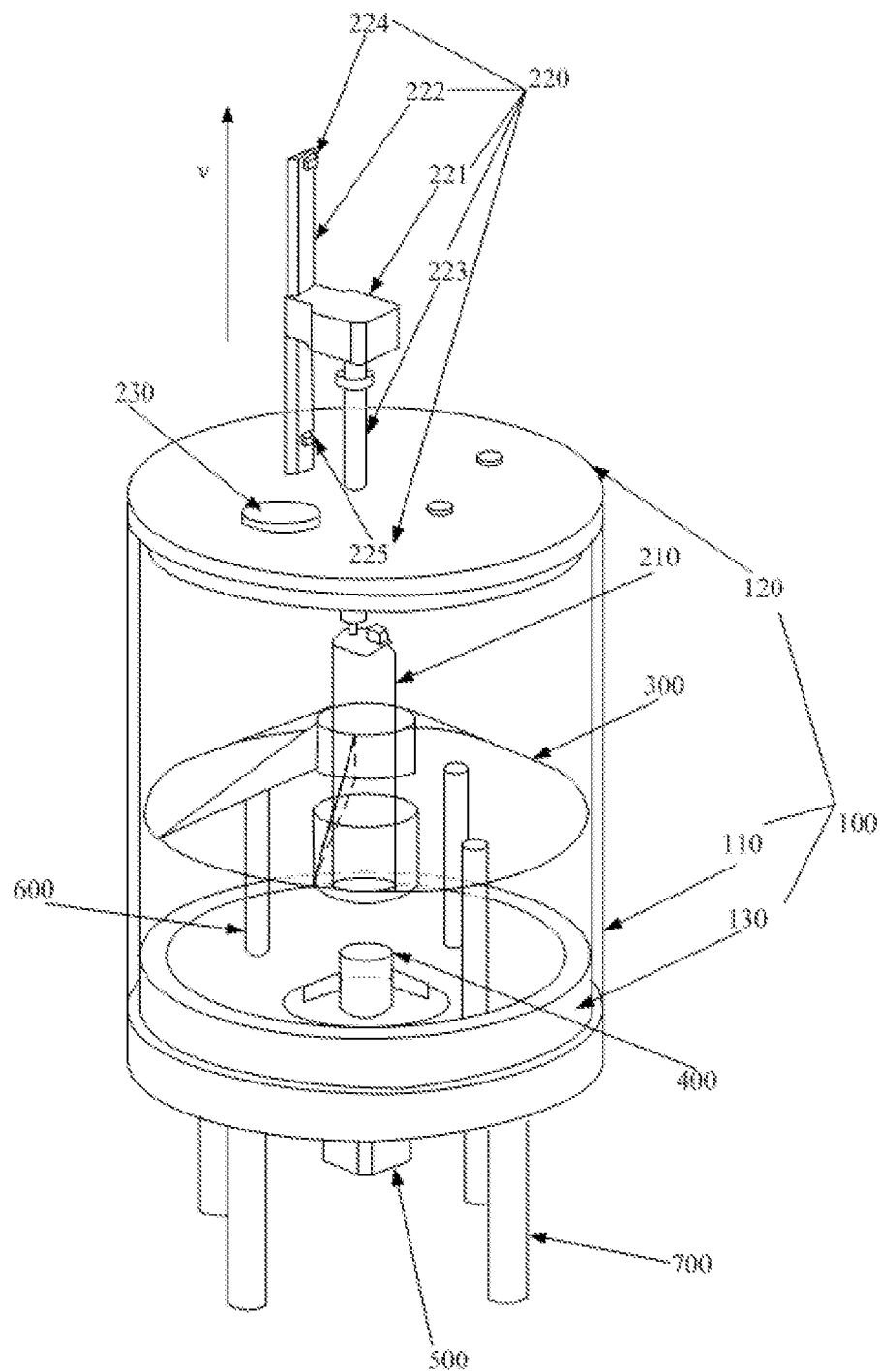
Figure 2:
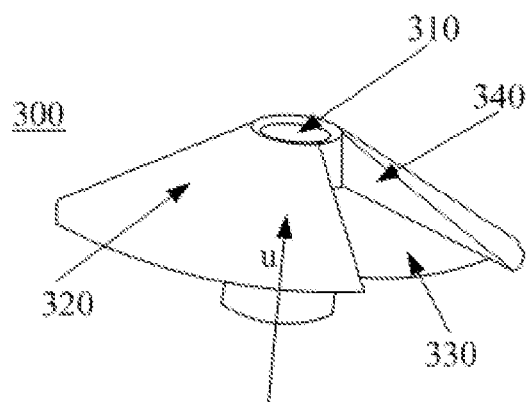
Figures 2, 3:
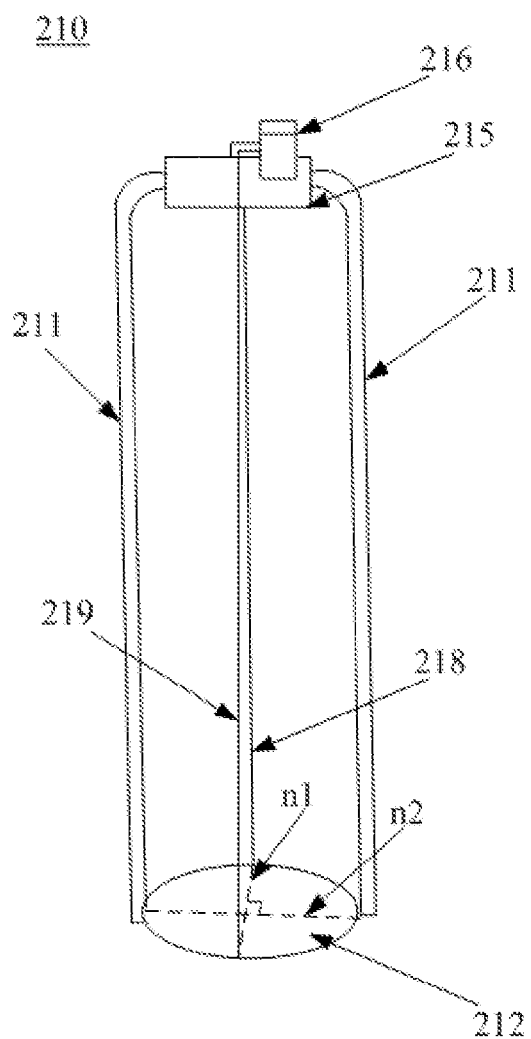

Optionally, as shown in FIG. 2-3, the solution lifting component 210 may include a pulling rod 211 and a bottom plate 212 positioned at one end of the pull rod 211. The pulling rod 211 can move down along the height direction of the through hole 310 shown in FIG. 2-2, i.e., move along a direction opposite to the one indicated by u in FIG. 2-2, under the control of the control component 220 shown in FIG. 2-1, thereby driving the bottom plate 212 to move into the to-be-defoamed solution at the bottom of the vacuum container 100 shown in FIG. 2-1. After the bottom plate 212 receives the to-be-defoamed solution, the pulling rod 211 can move up along the height direction of the through hole, i.e., move along a direction indicated by u in FIG. 2-2, under the control of the control component, thereby driving the bottom plate 212 to move to the upside of the liquid flowing platform 300 shown in FIG. 2-1 via the through hole. The to-be-defoamed solution at the bottom of the vacuum container can be lifted up to the upside of the liquid flowing platform by the pulling rod and the bottom plate.

As shown in FIG. 2-3, the bottom plate 212 may have a platy structure. When passing through the through hole, the bottom plate 212 may form a cylindrical chamber having a sealed bottom with the through hole. The bottom plate and the through hole may cooperate with each other to receive the lifted to-be-defoamed solution, so as to prevent a leakage of the to-be-defoamed solution. Optionally, the through hole may be a square hole and may also be a circular hole. When the through hole is the square hole, the bottom plate may be a square bottom plate. When the through hole is the circular hole, the bottom plate may be a circular bottom plate. Other examples of the shapes of the through hole and the bottom plate are in the scope of the disclosure as long as they are matched mutually.

Figures 2, 3, 4:
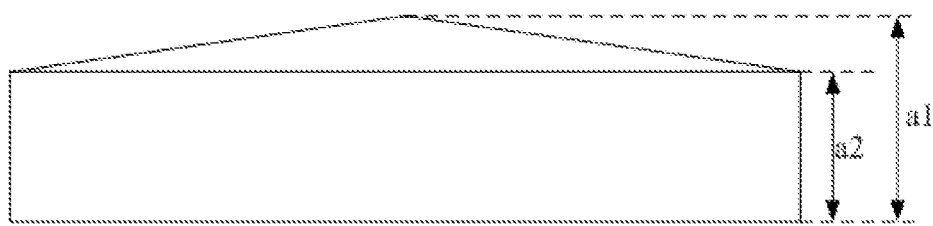

An upper surface of the bottom plate, i.e., a surface of the bottom plate close to the top of the vacuum container, may be a conical surface, such that the to-be-defoamed solution on the bottom plate may flow to the liquid flowing platform more quickly. As shown in FIG. 2-4, a distance a1 from a center of the conical surface to a bottom end of the bottom plate may be greater than a distance a2 from an edge of the conical surface to the bottom end of the bottom plate. A taper angle of the conical surface may be greater than a preset value in order to receive more to-be-defoamed solution.

Further, as shown in FIG. 2-3, the solution lifting component 210 may further include a supporting plate 215, and two pulling rods 211 may be provided.

Either end of the bottom plate 212 may be movably connected to one end of the pulling rod 211. The other ends of the two pulling rods 211 may be connected to the supporting plate 215. The control component 220 shown in FIG. 2-1 may be connected to the supporting plate 215.

Further, as shown in FIG. 2-3, the solution lifting component 210 may further include two pulling ropes and a first driving mechanism 216. The two pulling ropes may include a first pulling rope 218 and a second pulling rope 219.

The first driving mechanism 216 may be arranged on the supporting plate 215. The bottom plate 212 may be connected to the supporting plate 215 via the first pulling rope 218, and to the first driving mechanism 216 via the second pulling rope 219. The second rope 219 may control a plate surface of the bottom plate 212 to be perpendicular or parallel to the height direction of the through hole under a driving action of the first driving mechanism 216.

Optionally, a density of the bottom plate 212 may be non-uniform. In the to-be-defoamed solution, the plate surface of the bottom plate 212 may be parallel to the height direction of the through hole.

As shown in FIG. 2-3, a first connection line n1 for connection points of the two pulling ropes and the bottom plate 212 may be perpendicular to a second connection line n2 for connection points of the two pulling rods 211 and the bottom plate 212, so as to lift the to-be-defoamed solution up to the upside of the liquid flowing platform more stably.

For example, as shown in FIG. 2-5, the bottom plate 212 may include a first sub-plate 2121 and a second sub-plate 2122 which have a same volume. A density of the first sub-plate 2121 may be greater than that of the second sub-plate 2122. The first pulling rope 218 may be connected to the second sub-plate 2122, and the second pulling rope 219 may be connected to the first sub-plate 2121. The first sub-plate 2121 and the second sub-plate 2122 are one piece part.

Provided that the through hole is the circular hole, the bottom plate may be the circular bottom plate. When the bottom plate is the circular bottom plate, both the first sub-plate and the second sub-plate may be semicircular, and the two pulling rods may be arranged at two ends of a straight edge of a semicircle. Since the first sub-plate and the second sub-plate have a same volume and the density of first sub-plate is greater than that of the second sub-plate, a weight of the first sub-plate may be greater than that of the second sub-plate. As a result, when the second pulling rope does not apply pulling force to the first sub-plate, the bottom plate will rotate 90 degrees (DEGs) around the straight edge of the semicircle, such that the first sub-plate may be positioned under the second sub-plate.

Referring to FIG. 2-3, when the first driving mechanism 216 rotates clockwise, a length of the second pulling rope 219 connected to the first sub-plate 2121 shown in FIG. 2-5 may be increased. The second pulling rope 219 does not apply pulling force to the first sub-plate, and the bottom plate 212 may rotate 90 DEG. As a result, the first sub-plate may be positioned under the second sub-plate. At this moment, the plate surface of the bottom plate may be parallel to the height direction of the through hole, and the first driving mechanism 216 may stop rotating. When the first driving mechanism 216 rotates anticlockwise, the second pulling rope 219 connected to the first sub-plate may be tensed. The second pulling rope 219 may apply pulling force to the first sub-plate, and the bottom plate 212 may rotate −90 DEG. As a result, the first sub-plate and the second sub-plate may be positioned on a same horizontal plane. At this moment, the plate surface of the bottom plate may be perpendicular to the height direction of the through hole, and the first driving mechanism 216 may stop rotating. The bottom plate may be fixed by both the first pulling rope 218 and the second pulling rope 219, and can move up stably. For example, the first driving mechanism may be a motor. A rotation of the motor may be controlled by a pulse signal and a specific process may be referred to other implementations.

Optionally, as shown in FIG. 2-1, the control component 220 may include a second driving mechanism 221, a guide rail 222 and a lead screw 223.

The guide rail 222 may be arranged on a top of the chamber of the vacuum container 100. A height direction of the guide rail 222, i.e., a direction indicated by v in FIG. 2-1 or a direction opposite to that, may be parallel to that of the through hole, i.e., a direction indicated by u in FIG. 2-2 or a direction opposite to that.

The second driving mechanism 221 may be arranged on the guide rail 222. For example, the second driving mechanism may be a motor.

The lead screw 223 may be connected to the second driving mechanism 221 and the supporting plate 215 shown in FIG. 2-3. The second driving mechanism 221 can drive the lead screw 223 to rotate so that the supporting plate may move along the height direction of the though hole.

FIG. 2-6 shows a schematic diagram for a connection between the lead screw 223 and the supporting plate 215 of the solution lifting component. In FIG. 2-6, 216 is the first driving mechanism, and 212 is the bottom plate.

According to some aspects, as shown in FIG. 2-1, the second driving mechanism 221 may be connected to the guide rail 222 in a sleeving manner. When the second driving mechanism 221 is connected to the guide rail 222 in the sleeving manner, the lead screw 223 may apply a pushing force or a pulling force to the second driving mechanism 221 in a rotation process, so that the second driving mechanism 221 may move along the guide rail 222. The guide rail may be configured to guide the second driving mechanism. For example, when the lead screw rotates clockwise, it may apply the pulling force to the second driving mechanism, so that the second driving mechanism may move down along a height direction of the guide rail on the guide rail, i.e., move along a direction opposite to the one indicated by v in FIG. 2-1. When the lead screw rotates anticlockwise, it may apply the pushing force to the second driving mechanism, so that the second driving mechanism may move up along the height direction of the guide rail on the guide rail, i.e., move along a direction indicated by v in FIG. 2-1. Through the second driving mechanism which may move along the guide rail, a moving position of the bottom plate may be detected, such that the second driving mechanism may control the solution lifting component better.

Furthermore, as shown in FIG. 2-1, the control component may further include a first sensor 224, such that the control component may control the solution lifting component moving downward better. The first sensor 224 may be arranged on the guide rail 222.

The first sensor 224 may be configured to indicate the first driving mechanism 216 shown in FIG. 2-3 to rotate, so that the plate surface of the bottom plate may be parallel to the height direction of the through hole, and to indicate the second driving mechanism 221 to drive the lead screw 223 to rotate, so that the supporting plate 215 shown in FIG. 2-3 may move down along the height direction of the through hole, when detecting that an upper surface edge of the bottom plate 212 shown in FIG. 2-3 and a top end of the through hole 310 shown in FIG. 2-2 are positioned on a same plane. As described in the above, since the second driving mechanism 221 can drive the lead screw 223 to rotate, the rotation of the lead screw 223 may drive the supporting plate to move along the height direction of the through hole. As the supporting plate is connected to the bottom plate via the pulling rod, the bottom plate may move down along the height direction of the through hole, when the supporting plate moves down along the height direction of the through hole. Meanwhile, the rotation of the lead screw 223 may drive the second driving mechanism 221 to move along the guide rail 222. Therefore, the first sensor 224 may be arranged at a first position of the guide rail 222. The first position may be a position of the second driving mechanism 221 on the guide rail 222 when the upper surface edge of the bottom plate and the top end of the through hole are positioned on the same plane. In this way, when the second driving mechanism 221 moves up to the first position under the pushing force of the lead screw 223, the first sensor 224 can determine that the upper surface edge of the bottom plate and the top end of the through hole are positioned on the same plane. At this moment, the first sensor 224 may indicate the first driving mechanism 216 shown in FIG. 2-3 to rotate, so that the length of the second pulling rope 219 shown in FIG. 2-3 connected to the first sub-plate 2121 shown in FIG. 2-5 may be increased. Thus, the second pulling rope 219 does not apply pulling force to the first sub-plate, and the bottom plate 212 shown in FIG. 2-3 may rotate 90 DEG. As a result, the first sub-plate may be positioned under the second sub-plate, and the plate surface of the bottom plate may be parallel to the height direction of the through hole. Then the first driving mechanism may stop rotating. The first sensor 224 may indicate the second driving mechanism 221 to drive the lead screw 223 to rotate, so that the supporting plate 215 shown in FIG. 2-3 may move down along the height direction of the through hole, and the bottom plate may also move down along the height direction of the through hole. The bottom plate may move down vertically and slowly into the to-be-defoamed solution at the bottom of the vacuum container. Since the weight of the first sub-plate is greater than that of the second sub-plate of the bottom plate, the first sub-plate may be still positioned under the second sub-plate and the plate surface of the bottom plate may be parallel to the height direction of the through hole when the bottom plate is in the to-be-defoamed solution, so that the bottom plate may receive the to-be-defoamed solution at the bottom of the vacuum container conveniently. At the meantime, when the bottom plate is dipped into the to-be-defoamed solution, a contact area of the bottom plate and the to-be-defoamed solution is relatively small, because the plate surface of the bottom plate is parallel to the height direction of the through hole under the action of the pulling ropes. In this way, the bottom plate may be prevented from bringing air into the to-be-defoamed solution once again which may produce new foams.

Furthermore, as shown in FIG. 2-1, the control component 220 may further include a second sensor 225, such that the control component may control the solution lifting component moving upward better. The second sensor 225 may be arranged on the guide rail 222.

The second sensor 225 may be configured to indicate the first driving mechanism 216 to rotate, so that the plate surface of the bottom plate may be perpendicular to the height direction of the through hole, and to indicate the second driving mechanism 221 to drive the lead screw 223 to rotate, so that the supporting plate 215 shown in FIG. 2-3 may move up along the height direction of the through hole, when detecting that the top end of the bottom plate 212 shown in FIG. 2-3 parallel to the height direction of the through hole 310 shown in FIG. 2-2 leaves away from the through hole and moves to the to-be-defoamed solution at the bottom of the vacuum container 100. As described in the above, when the supporting plate moves up along the height direction of the through hole, the bottom plate may also move up along the height direction of the through hole. Meanwhile, the rotation of the lead screw 223 may drive the second driving mechanism 221 to move along the guide rail 222. Therefore, the second sensor 225 may be arranged at a second position of the guide rail 222. The second position may be a position of the second driving mechanism 221 on the guide rail 222 when the top end of the bottom plate parallel to the height direction of the through hole leaves away from the through hole and moves to the to-be-defoamed solution at the bottom of the vacuum container. In this way, when the second driving mechanism 221 moves down to the second position under the pulling force of the lead screw 216, the second sensor 225 can determine that the top end of the bottom plate parallel to the height direction of the through hole leaves away from the through hole and moves to the to-be-defoamed solution at the bottom of the vacuum container. At this moment, the second sensor 225 may indicate the first driving mechanism 216 shown in FIG. 2-3 to rotate, so that the second pulling rope 219 shown in FIG. 2-3 connected to the first sub-plate 2121 shown in FIG. 2-5 may be tensed. Thus, the second pulling rope 219 may apply pulling force to the first sub-plate, and the bottom plate 212 shown in FIG. 2-3 may rotate −90 DEG. As a result, the first sub-plate and the second sub-plate may be positioned on the same horizontal plane, and the plate surface of the bottom plate may be perpendicular to the height direction of the through hole, and the bottom plate may receive the to-be-defoamed solution. Then, the first driving mechanism may stop rotating. The second sensor 225 may indicate the second driving mechanism 221 to drive the lead screw 223 to rotate, so that the supporting plate 215 shown in FIG. 2-3 may move up along the height direction of the through hole, and the bottom plate which receives the to-be-defoamed solution may also move up stably along the height direction of the through hole.

According to other aspects, the second driving mechanism may be fixed at a top end of the guide rail, i.e., an end far away from the vacuum container. A limiting plate may be arranged on the lead screw and it may be connected to the guide rail in the sleeving manner. With the moving of the lead screw, the limiting plate can move along the guide rail. For example, when the lead screw rotates clockwise, the limiting plate may move down along the height direction of the guide rail, and when the lead screw rotates anticlockwise, the limiting plate may move up along the height direction of the guide rail. Accordingly, the first sensor may be arranged at a position of the limiting plate on the guide rail when the upper surface edge of the bottom plate and the top end of the through hole are positioned on the same plane. The second sensor may be arranged at a position of the limiting plate on the guide rail when the top end of the bottom plate parallel to the height direction of the through hole leaves away from the through hole and moves to the to-be-defoamed solution at the bottom of the vacuum container.

As shown in FIG. 2-1, the solution introducing part may further include a feed port 230 arranged on the top of the chamber of the vacuum container 100. By means of the feed port 230, the to-be-defoamed solution may be introduced from the upside of the liquid flowing platform 300. In the embodiments of the disclosure, the to-be-defoamed solution may also enter the chamber of the vacuum container from the feed port originally, and then flows through the interval between the liquid flowing platform and the vacuum container to the bottom of the vacuum container, and the to-be-defoamed solution at the bottom of the vacuum container may be introduced from the upside of the liquid flowing platform by means of the solution introducing part.

Optionally, as shown in FIG. 2-2, an umbrella surface of the liquid flowing platform 300 may include a first curved surface 320, a second curved surface 330 and two planes 340. One of the two planes is shown in FIG. 2-2.

Either side of the second curved surface 330 may be connected to the first curved surface 320 via one plane 340. An interval between an umbrella edge of the first curved surface 320 and the chamber wall of the vacuum container 100 shown in FIG. 2-1 may be smaller than the one between an umbrella edge of the second curved surface 330 and the chamber wall of the vacuum container.

A projection of the feed port 230 shown in FIG. 2-1 at the bottom of the vacuum container may be positioned in a projection of the second curved surface 330 at the bottom of the vacuum container. The to-be-defoamed solution entering the chamber of the vacuum container from the feed port originally may flow through the interval between the umbrella edge of the second curved surface and the chamber wall of the vacuum container to the bottom of the vacuum container to be stirred by the solution stirrer.

As shown in FIG. 2-2, an inclination of the second curved surface may be smaller than that of the first curved surface, to control a speed that the to-be-defoamed solution passes through the interval between the umbrella edge of the second curved surface and the chamber wall of the vacuum container.

FIG. 2-7 shows a top view of the liquid flowing platform 300. In FIG. 2-7, 320 is the first curved surface, 330 is the second curved surface, and 310 is the through hole.

The liquid flowing platform with such a structure is convenient for the to-be-defoamed solution to flow through the interval between the liquid flowing platform and the vacuum container to the bottom of the vacuum container. Since it is not easy to control the speed that the to-be-defoamed solution enters the chamber of the vacuum container from the feed port originally, the interval between umbrella edge of the second curved surface and the chamber wall of the vacuum container may be relatively large. When the to-be-defoamed solution flows through the interval between the second curved surface and the vacuum container, rough defoaming may be implemented on the to-be-defoamed solution to remove relatively large foams in the to-be-defoamed solution. In contrast, the lifted to-be-defoamed solution may flow through the interval between the first curved surface and the vacuum container and a liquid flowing amount may be controlled by a lifting speed. Therefore, the interval between the umbrella edge of the first curved surface and the chamber wall of the vacuum container may be relatively small. The to-be-defoamed solution flows through the interval between the first curved surface and the vacuum container and may slide down along the chamber wall of the vacuum container uniformly at a relatively thin thickness, thereby implementing fine defoaming on the to-be-defoamed solution to remove small foams in the to-be-defoamed solution. By the defoaming device, the rough defoaming operation may be implemented once and the fine defoaming operation may be implemented multiple times. During the to-be-defoamed solution flows through the interval between the liquid flowing platform and the vacuum container, the foams in the to-be-defoamed solution may be exposed out of the to-be-defoamed solution and may be broken. Therefore, the defoaming device may achieve the purpose of quickly defoaming by circulating a flowing liquid.

A projection area of the first curved surface at the bottom of the vacuum container may be greater than that of the second curved surface at the bottom of the vacuum container, so as to finely defoam more to-be-defoamed solution. Specifically, it may be referred to the FIG. 2-7.

In addition, the liquid flowing platform 300 may also be as shown in FIG. 2-8. The umbrella surface of the liquid flowing platform 300 may include a first curved surface 320 and a second curved surface 330. The interval between the umbrella edge of the first curved surface 320 and the chamber wall of the vacuum container may be smaller than the one between the umbrella edge of the second curved surface 330 and the chamber wall of the vacuum container. The first curved surface 320 and the second curved surface 330 may have a same inclination. Compared with the liquid flowing platform shown in FIG. 2-8, the liquid flowing platform shown in FIG. 2-2 may have a better effect in controlling the speed that the to-be-defoamed solution passes through the interval between the umbrella edge of the second curved surface and the chamber wall of the vacuum container.

Optionally, as shown in FIG. 2-1, the vacuum container 100 may include a vacuum chamber 110, as well as a top cover 120 arranged at a top end of the vacuum chamber 110 and a pedestal 130 arranged at a bottom end of the vacuum chamber 110. An inner wall of the vacuum chamber 110, an inner wall of the top cover 120 and an inner wall of the pedestal 130 may form the chamber.

As shown in FIG. 2-9, a surface A of the pedestal 130 facing toward the top cover 120 shown in FIG. 2-1 may be a conical surface, to better receive the to-be-defoamed solution and facilitate that the bottom plate effectively receives the to-be-defoamed solution at the bottom of the vacuum container. In addition, the to-be-defoamed solution on the pedestal can also be fully stirred by the solution stirrer.

As shown in FIG. 2-10, a distance d1 from a center of the conical surface of the pedestal 130 to the top cover 120 may be greater than a distance d2 from an edge of the conical surface to the top cover 120.

Further, as shown in FIG. 2-1, the defoaming device may further include a third driving mechanism 500.

The third driving mechanism 500 may be electrically connected to the solution stirrer 400. The third driving mechanism 500 may be arranged at a side of the pedestal 130 which is far away from the top cover 120. By means of the third driving mechanism, the solution stirrer may be controlled to stir the to-be-defoamed solution. For example, the third driving mechanism may be a motor.

Additionally, it should be noted that the to-be-defoamed solution generally is an organic solution, and the organic solution generally has a corresponding maximum temperature. When the temperature of the organic solution is in excess of the maximum temperature, it is possible that the organic solution deteriorates. To prevent the to-be-defoamed solution on the pedestal from deteriorating, the pedestal 130 shown in FIG. 2-1 may be provided with a cavity and a temperature adjustment component which is not shown in FIG. 2-1 may be arranged inside the pedestal 130. The temperature adjustment component may be configured to keep a temperature of the to-be-defoamed solution on the pedestal 130 at a target temperature. The target temperature may be a temperature at which a viscosity of the to-be-defoamed solution may be minimum. The greater the viscosity of the to-be-defoamed solution is, the more easily the to-be-defoamed solution deteriorates.

Likewise, to prevent the to-be-defoamed solution flowing through the liquid flowing platform from deteriorating, the liquid flowing platform 300 shown in FIG. 2-1 may be provided with a cavity and a temperature adjustment component which is not shown in FIG. 2-1 may be arranged inside the liquid flowing platform 300. The temperature adjustment component may be configured to keep a temperature of the to-be-defoamed liquid flowing through the liquid flowing platform 300 at a target temperature. The target temperature may be a temperature at which a viscosity of the to-be-defoamed solution may be minimum.

In practical applications, the temperature of the temperature adjustment component may be adjusted according to characteristics of the to-be-defoamed solution, so as to perform constant temperature heating to the to-be-defoamed solution and thus promote removing the foams.

For example, the temperature adjustment components inside the pedestal and the liquid flowing platform may include heating wires and cooling water. The heating wires may heat the to-be-defoamed solution in case that the temperature of the to-be-defoamed solution is relatively low. The cooling water may cool the to-be-defoamed solution in case that the temperature of the to-be-defoamed solution is relatively high. By means of the heating wires and the cooling water, it is possible to control the temperature of the to-be-defoamed solution.

Further, as shown in FIG. 2-1, the defoaming device may further include at least three supporting columns 600 having an equal length. The at least three supporting columns 600 may be fixedly arranged between the liquid flowing platform 300 and the pedestal 130, and may be configured to support the liquid flowing platform 300. As an example, FIG. 2-1 shows three supporting columns. Optionally, each of the supporting columns 600 may have a hollow structure, which may be configured to accommodating connecting wires of the temperature adjustment component. For example, the supporting columns may accommodate the connecting wires of the heating wires, when the temperature adjustment component comprises the heating wires. The supporting columns may transfer the cooling water, when the temperature adjustment component comprises the cooling water.

Further, as shown in FIG. 2-1, the defoaming device may further include at least three feet 700 having an equal length. The at least three feet 700 may be arranged at a side of the pedestal 130 which is far away from the top cover 120. The feet may be configured to prevent rest parts of the defoaming device other than the feet from directly contacting the ground and may play a role of supporting the rest parts. As an example, FIG. 2-1 shows four feet.

Optionally, as shown in FIG. 2-9, the pedestal 130 may be provided with an opening 131. The solution stirrer may be electrically connected to the third driving mechanism 500 shown in FIG. 2-1 via the opening 131.

Further, as shown in FIG. 2-9, the pedestal 130 may further be provided with a discharging port 132. The defoamed solution may flow out through the discharging port 132. 133 shown in FIG. 2-9 are column holes configured to fix the supporting columns 600 shown in FIG. 2-1.

As shown in FIG. 2-10, the top cover 120 may be provided with a vacuum port 121 and a gas inlet 122. The vacuum chamber 110 may communicate with an external vacuum pump which is not shown in FIG. 2-10 via the vacuum port 121. An external gas can enter the vacuum chamber 110 via the gas inlet 122.

After the to-be-defoamed solution is introduced to the liquid flowing platform through the feed port, the chamber of the vacuum container may be vacuumed via the vacuum port, so that the chamber may be at a low pressure facilitating the defoaming operation to be performed rapidly. After the defoaming, a gas at a preset pressure may be charged into the vacuum chamber via the gas inlet, so that the pressure inside the chamber may be higher than an external pressure, so as to facilitate the defoamed solution to flow out from the chamber.

As shown in FIG. 2-10, the top cover 120 may be further provided with a thread port 123. The thread port 123 may be configured to fix the lead screw 223 shown in FIG. 2-1 of the control component.

Referring to FIG. 2-1, FIG. 2-2, FIG. 2-3 and FIG. 2-10, when the defoaming device provided by the embodiments of the disclosure is used for performing the defoaming operation, the to-be-defoamed solution may be introduced into the liquid flowing platform 300 through the feed port 230, and then the feed port 230 may be sealed to seal the chamber of the vacuum container 100. The chamber of the vacuum container 100 may be vacuumed via the vacuum port 121 by the external vacuum pump 121, so that the chamber may be at low pressure. The to-be-defoamed solution may flow through the interval between the umbrella edge of the second curved surface 330 of the liquid flowing platform 300 and the chamber wall of the vacuum container 100 to the bottom of the vacuum container 100, thereby implementing the rough defoaming operation. Then, the to-be-defoamed solution at the bottom of the vacuum container 100 may be stirred by the solution stirrer 400 so as to reduce the stability of the small foams inside the to-be-defoamed solution and promote the foams to move up. Thereafter, a reintroducing process may be implemented once for every preset time interval. The reintroducing process may include the following.

When detecting that the upper surface edge of the bottom plate 212 and the top end of the through hole 310 are positioned on the same plane, the first sensor 224 may indicate the first driving mechanism 216 to rotate, so that the plate surface of the bottom plate 212 may be parallel to the height direction of the through hole 310. The first driving mechanism 216 may stop rotating. The first sensor 224 may indicate the second driving mechanism 221 to drive the lead screw 223 to rotate, so that the supporting plate 215 may move down along the height direction of the through hole 310. As a result, the supporting plate 215 may drive the pulling rods 211 to move down, and the bottom plate 212 may move down along the height direction of the through hole 310. The bottom plate 212 may drop off vertically and slowly into the to-be-defoamed solution at the bottom of the vacuum container 100.

When detecting that the top end of the bottom plate 212 parallel to the height direction of the through hole 310 leaves away from the through hole 310 and moves to the to-be-defoamed solution at the bottom of the vacuum container 100, the second sensor 225 may indicate the first driving mechanism 216 to rotate, so that the plate surface of the bottom plate 212 may be perpendicular to the height direction of the through hole 310 and the bottom plate 212 may receive the to-be-defoamed solution. The first driving mechanism 216 may stop rotating. The second sensor 225 may indicate the second driving mechanism 221 to drive the lead screw 223 to rotate, so that the supporting plate 215 may move up along the height direction of the through hole. As a result, the supporting plate 215 may drive the pulling rod 211 to move up, and the bottom plate 215 which receives the to-be-defoamed solution may also move up stably along the height direction of the through hole 310, and the bottom plate 215 may move to the upside of the liquid flowing platform 300 via the through hole 310. In this way, the to-be-defoamed solution may be introduced to the liquid flowing platform 300 again, so that the to-be-defoamed solution can flow through the interval between the umbrella edge of the first curved surface 320 and the chamber wall of the vacuum container 100 to the bottom of the vacuum container 100, thereby implementing the fine defoaming operation. Every time when the to-be-defoamed solution flows to the bottom of the vacuum container 100, it may be stirred by the solution stirrer 400.

After the whole defoaming operation is implemented, the gas at the preset pressure may be charged into the vacuum chamber via the gas inlet on the top cover, and the defoamed solution may be discharged from the chamber of the vacuum container through the discharging port on the pedestal.

The defoaming device provided by the embodiments of the disclosure may implement the defoaming operation by combining vacuuming, stirring, circulating the flowing liquid, heating and so on, thereby achieving the purpose of quickly defoaming.

In conclusion, according to the defoaming device provided by the embodiments of the disclosure, the solution introducing part of the defoaming device can introduce the to-be-defoamed solution from the upside of the liquid flowing platform, so that the to-be-defoamed solution may flow through the interval between the liquid flowing platform and the vacuum container to the bottom of the vacuum container to be stirred by the solution stirrer. The defoaming device can defoam the to-be-defoamed solution by stirring and by the interval between the liquid flowing platform and the vacuum container. Moreover, it can control the temperature of the to-be-defoamed solution. Therefore, the defoaming time may be shortened and the defoaming efficiency may be improved.

The embodiments of the disclosure further provide a method for defoaming, which may be used in the above-mentioned defoaming device. As shown in FIG. 3, the method may include:

Step 1501, introducing a to-be-defoamed solution from an upside of a liquid flowing platform by a solution introducing part, so that the to-be-defoamed solution may flow through an interval between the liquid flowing platform and a chamber wall of a vacuum container to a bottom of the vacuum container.

In conclusion, according to the method for defoaming provided by the embodiments of the disclosure, the to-be-defoamed solution may be introduced by the solution introducing part from the upside of the liquid flowing platform, so that the to-be-defoamed solution may flow through the interval between the liquid flowing platform and the vacuum container to the bottom of the vacuum container. The to-be-defoamed solution can be defoamed through the interval between the liquid flowing platform and the vacuum container. Therefore, the defoaming time may be shortened, and the defoaming efficiency may be improved.

Optionally, the solution introducing part may include a solution lifting component and a control component, and the liquid flowing platform may be provided with a through hole. Accordingly, the step 1501 may include:

Controlling the solution lifting component to move along a height direction of the through hole by the control component, so that the to-be-defoamed solution at the bottom of the vacuum container may be lifted up to the upside of the liquid flowing platform.

The embodiments of the disclosure further provide a method for defoaming, which may be used in the defoaming device shown in FIG. 2-1. As shown in FIG. 4-1, the method may include:

Step 1601, introducing a to-be-defoamed solution through a feed port to a liquid flowing platform.

As shown in FIG. 2-1, a solution introducing part may further include the feed port 230 arranged on a top of a chamber of a vacuum container 100. The to-be-defoamed solution may be introduced through the feed port 230 to the liquid flowing platform 300, so that the to-be-defoamed solution may flow through an interval between the liquid flowing platform 300 and a chamber wall of the vacuum container 100 to a bottom of the vacuum container 100. Thereafter, the to-be-defoamed solution at the bottom of the vacuum container 100 may be stirred by a solution stirrer 400, so as to reduce the stability of small foams inside the to-be-defoamed solution and promote the foams to move up.

Step 1602, sealing and vacuuming the chamber of the vacuum container.

As shown in FIG. 2-1, the vacuum container 100 may include a vacuum chamber 110, as well as a top cover 120 arranged at a top end of the vacuum chamber 110 and a pedestal 130 arranged at a bottom end of the vacuum chamber. An inner wall of the vacuum chamber 110, an inner wall of the top cover 120 and an inner wall of the pedestal 130 may form the chamber.

As shown in FIG. 2-10, the top cover 120 may further be provided with a vacuum port 121.

Specifically, the chamber of the vacuum container may be vacuumed via the vacuum port on the top cover.

Step 1603, implementing a reintroducing process once for every preset time interval, after the to-be-defoamed solution flows through the interval between the liquid flowing platform and the chamber wall of the vacuum container to the bottom of the vacuum container.

The reintroducing process may include:

controlling a solution lifting component to move along a height direction of a through hole by a control component, so that the to-be-defoamed solution at the bottom of the vacuum container may be lifted up to the upside of the liquid flowing platform, and reintroducing the to-be-defoamed solution to the liquid flowing platform, so that the to-be-defoamed solution may flow through the interval to the bottom of the vacuum container. Every time when the to-be-defoamed solution flows to the bottom of the vacuum container, it can be stirred by a solution stirrer.

Optionally, as shown in FIG. 2-3, the solution lifting component 210 may include a pulling rod 211 and a bottom plate 212 positioned at one end of the pulling rod 211. Accordingly, as shown in FIG. 4-2, said controlling the solution lifting component to move along the height direction of the through hole by the control component, so that the to-be-defoamed solution at the bottom of the vacuum container may be lifted up to the upside of the liquid flowing platform, may include:

Step 16031, controlling the pulling rod to move down along the height direction of the through hole by the control component, thereby driving the bottom plate to move into the to-be-defoamed solution at the bottom of the vacuum container.

Referring to FIG. 2-1 and FIG. 2-3, the pulling rod 211 may be controlled to move down along the height direction of the through hole by the control component 220, thereby driving the bottom plate 212 to move into the to-be-defoamed solution at the bottom of the vacuum container 100.

Step 16032, after the bottom plate receives the to-be-defoamed solution, controlling the pulling rod to move up along the height direction of the through hole by the control component, thereby driving the bottom plate to move to the upside of the liquid flowing platform via the through hole.

Referring to FIG. 2-1 and FIG. 2-3, after the bottom plate 212 receives the to-be-defoamed solution, the pulling rod 211 may be controlled to move up along the height direction of the through hole by the control component 220, thereby driving the bottom plate 212 to move to the upside of the liquid flowing platform 300 via the through hole.

Optionally, as shown in FIG. 2-3, the solution lifting component may further include two pulling ropes, a supporting plate 215 and a first driving mechanism 216.

As shown in FIG. 2-1, the control component 220 may include a second driving mechanism 221, a guide rail 222 and a lead screw 223. A first sensor 224 and a second sensor 225 may be arranged on the guide rail 222. The step 16031 may specifically include:

Indicating the first driving mechanism 216 shown in FIG. 2-3 to rotate, so that a plate surface of the bottom plate may be parallel to the height direction of the through hole, and indicating the second driving mechanism 221 to drive the lead screw 223 to rotate, so that the supporting plate 215 shown in FIG. 2-3 may move down along the height direction of the through hole, when the first sensor 224 detects that an upper surface edge of the bottom plate 212 shown in FIG. 2-3 and a top end of the through hole 310 shown in FIG. 2-2 are positioned on a same plane.

The step 16032 may specifically include:

Indicating the first driving mechanism to rotate, so that the plate surface of the bottom plate may be perpendicular to the height direction of the through hole, and indicating the second driving mechanism 221 to drive the lead screw 223 to rotate, so that the supporting plate may move up along the height direction of the through hole, when the second sensor 225 detects that a top end of the bottom plate parallel to the height direction of the through hole leaves away from the through hole and moves to the to-be-defoamed solution at the bottom of the vacuum container 100.

Step 1604, charging a gas at a preset pressure to the vacuum chamber.

As shown in FIG. 2-10, the top cover 120 may further be provided with a gas inlet 122. The gas at the preset pressure may be charged to the vacuum chamber via the gas inlet 122 on the top cover 120.

Step 1605, discharging a defoamed solution from the chamber of the vacuum container.

As shown in 2-9, the pedestal 130 may be provided with a discharging port 132. The defoamed solution may be discharged from the chamber of the vacuum container via the discharging port 132 on the pedestal 130.

In conclusion, according to the method for defoaming provided by the embodiments of the disclosure, the to-be-defoamed solution may be introduced by the solution introducing part from the upside of the liquid flowing platform, so that the to-be-defoamed solution may flow through the interval between the liquid flowing platform and the vacuum container to the bottom of the vacuum container to be stirred by the solution stirrer. The method for defoaming can defoam the to-be-defoamed solution by stirring and by the interval between the liquid flowing platform and the vacuum container. The rough defoaming and fine defoaming processes may be accomplished by circulating a flowing liquid. Therefore, the defoaming time may be shortened and the defoaming efficiency may be improved.

Figures 2, 3, 4, 5:
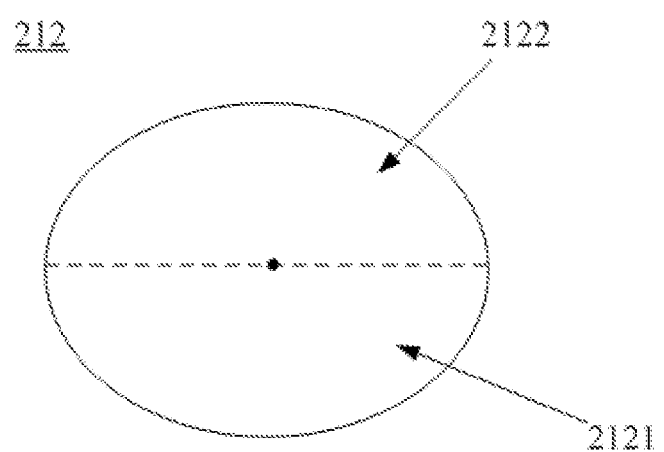
Figures 2, 3, 4, 5, 6:
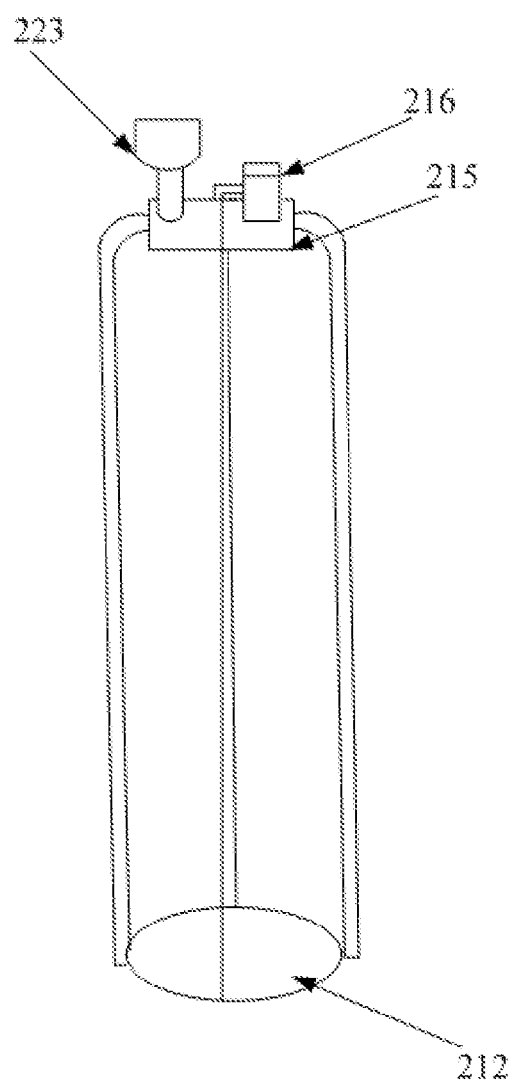
Figures 2, 3, 4, 5, 6, 7:
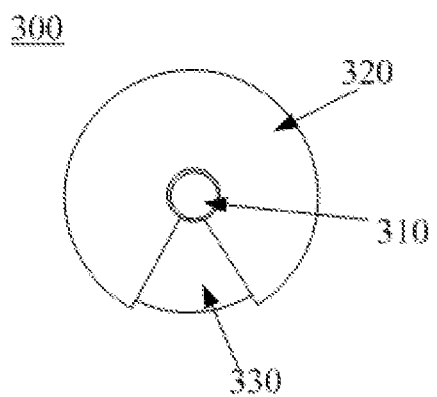
Figures 2, 3, 4, 5, 6, 7, 8:
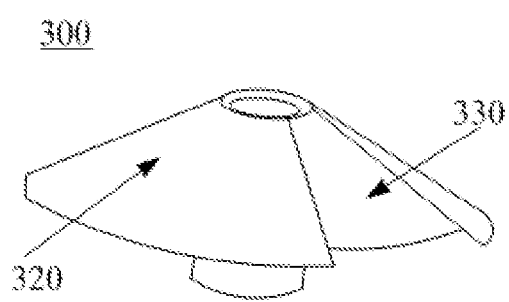
Figures 2, 3, 4, 5, 6, 7, 8, 9:
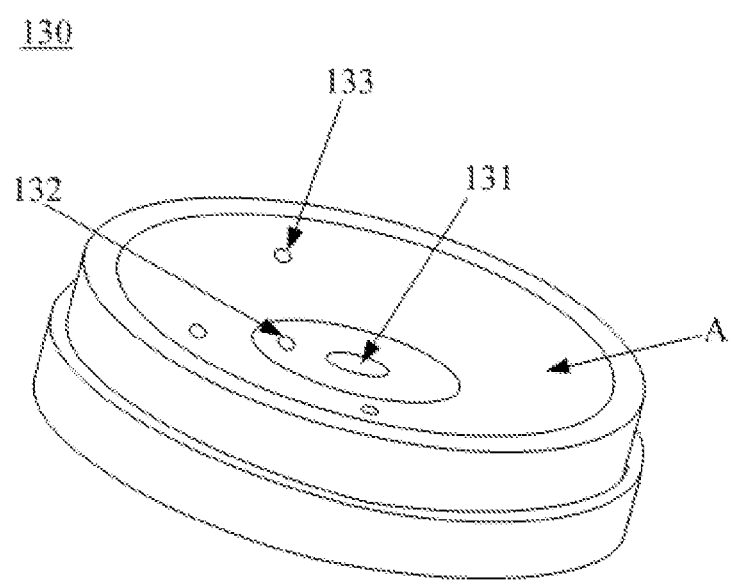
Figures 2, 3, 4, 5, 6, 7, 8, 9, 10:
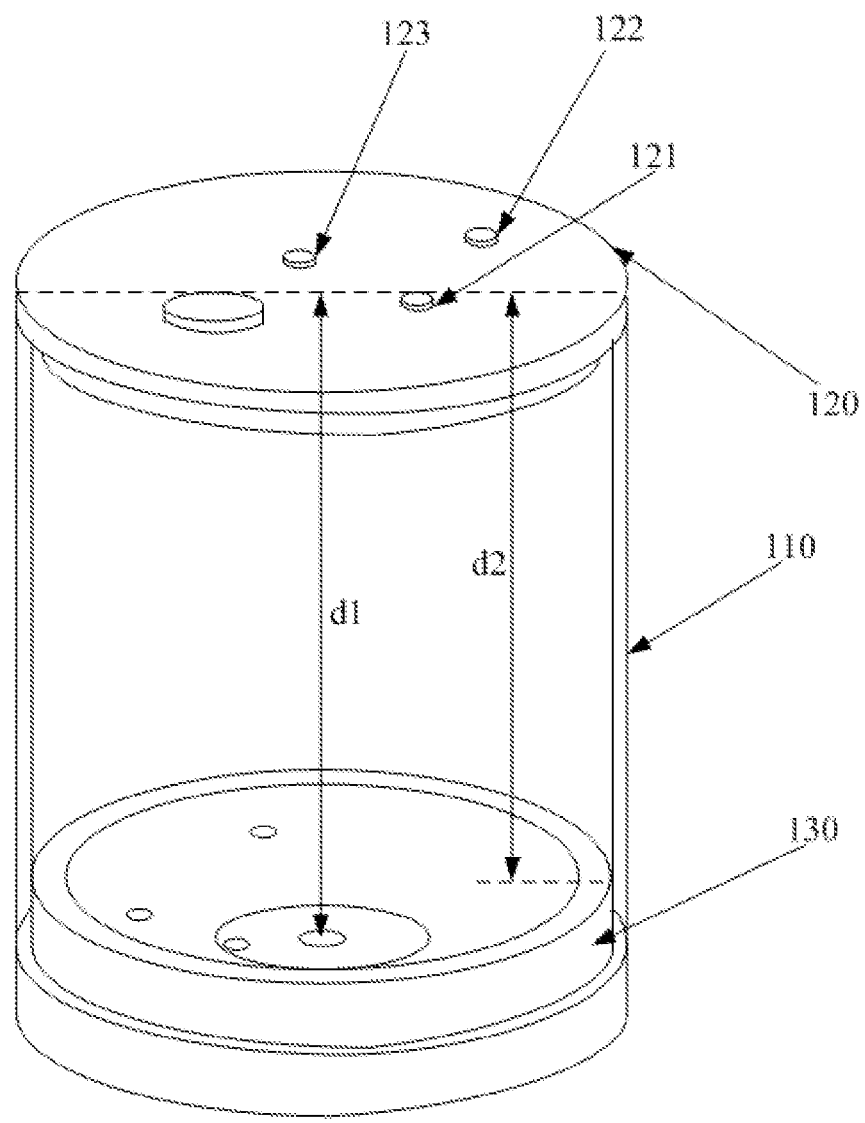
Figures 1, 4:
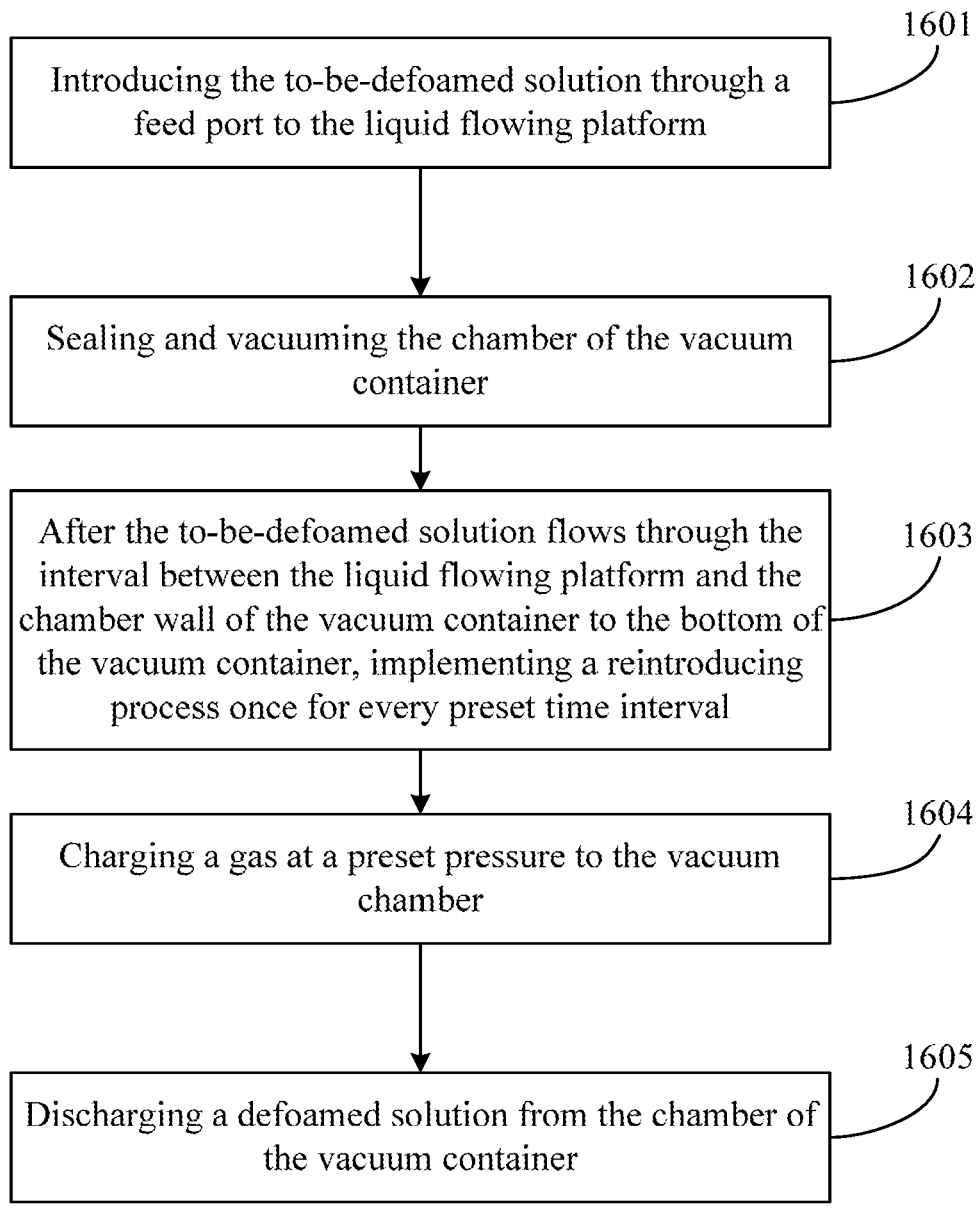
Figures 2, 4:
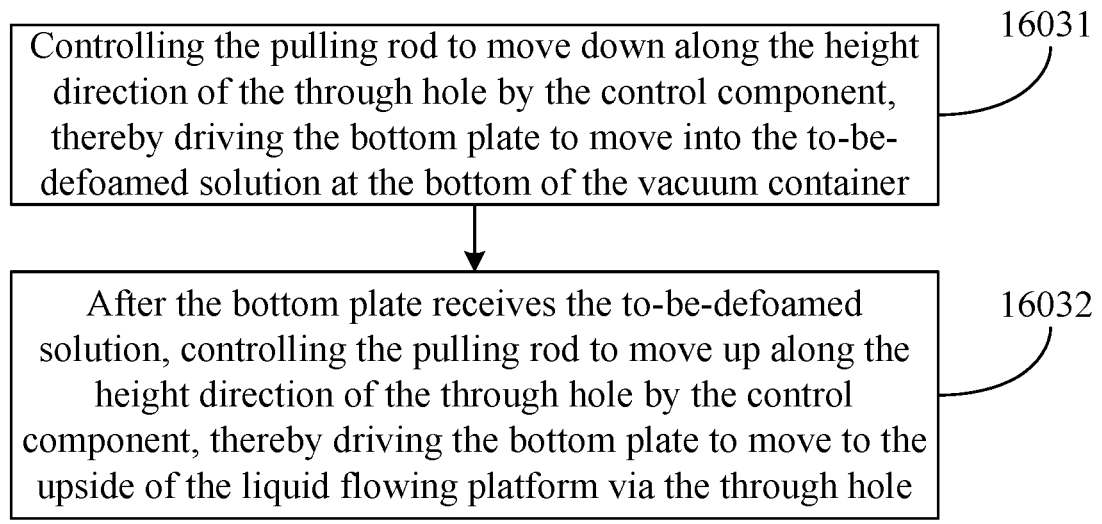
Figure 5:
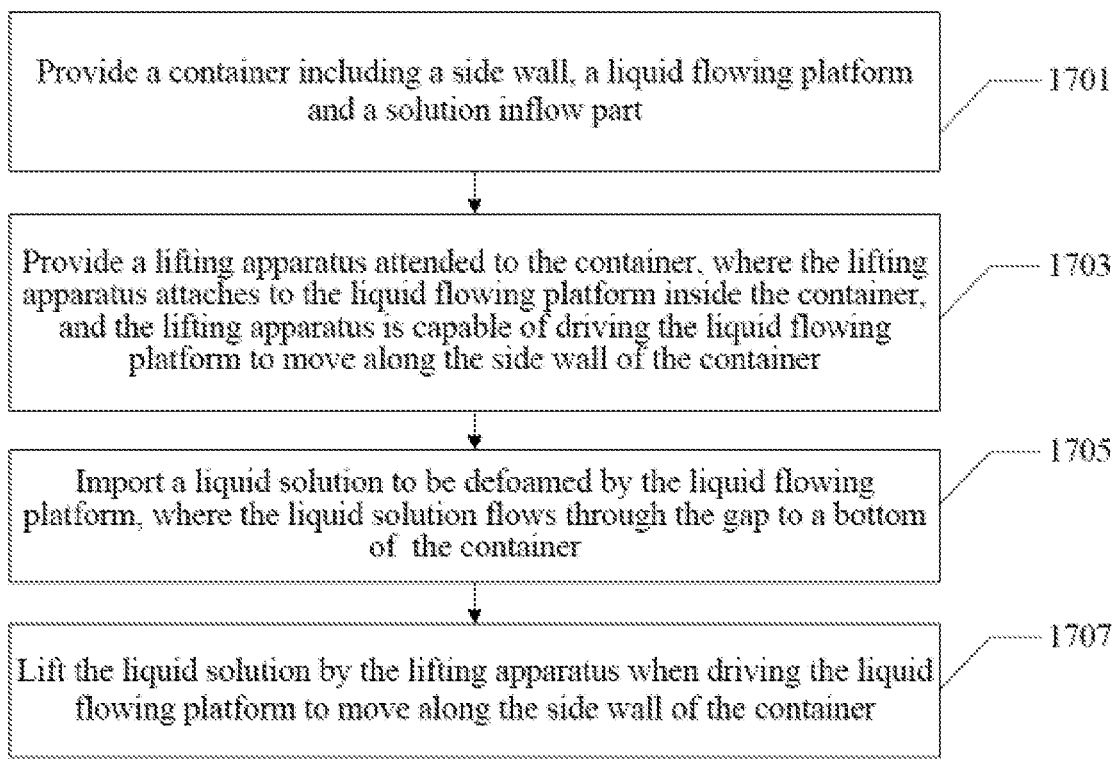

FIG. 5 illustrates a process of defoaming by using a defoaming device. As shown in FIG. 5, the process includes providing a container comprising a side wall, a liquid flowing platform and a solution inflow part 1701. The liquid flowing platform may be placed inside the container where the liquid flowing platform has a shape substantially fitting into a shape of the side wall and the liquid flowing platform and the side wall has a gap in between. The solution inflow part may be attached to the container and the solution inflow part may be used for allowing a liquid solution to enter the container.

The process can also include providing a lifting apparatus attached to the container, where the lifting apparatus attaches to the liquid flowing platform inside the container, and the lifting apparatus is capable of driving the liquid flowing platform to move along the side wall of the container 1703. The liquid solution may be defoamed when the liquid solution passes through the gap between the liquid flowing platform and the side wall.

The process may also include importing a liquid solution to be defoamed by the liquid flowing platform where the liquid solution flows through the gap to a bottom of the container 1705 and lifting the liquid solution by the lifting apparatus when driving the liquid flowing platform to move along the side wall of the container 1707.

Optionally, the process may include turning the liquid flowing platform to a substantially 90-degree inside the container while the liquid flowing platform is driven to move along the side wall.

Optionally, the process may include sealing the container, and vacuuming the container by a vacuum pump.

Optionally, the process may include heating the liquid solution inside the container to a certain temperature by heating wires.

Optionally, the process may include stirring the liquid solution inside the container for defoaming the liquid solution by a solution stirrer.

It is clearly understandable for those skilled in the art that, for the convenience and conciseness of the description, the specific steps of the above method may be referred to corresponding description of the preceding device in the embodiments, and are not elaborated here.

It is understandable for those of ordinary skill in the art that all or part of the steps in the embodiments may be implemented by a hardware and may also be implemented by a program which instructs the related hardware. The program may be stored in a computer-readable storage medium. The storage medium described above may include a read-only memory, a disk or a compact disk.

The above description is preferred embodiments of the disclosure and is not intended to limit the disclosure. Any modification, equivalent replacement, or improvement made within the spirit and principle of the disclosure shall fall within the protection scope of the disclosure.

The invention claimed is:

1. A defoaming device comprising:
   an elongated container comprising a cylindrical-shaped side wall having a longitudinal direction,
   a liquid flowing platform inside the container, wherein:
   the liquid flowing platform is umbrella shaped thereby substantially fitting into the cylindrical-shaped side wall;
   the liquid flowing platform and the cylindrical-shaped side wall has a gap in between;
   a solution inflow part attached to the container; and
   the solution inflow part is configured to allow a liquid solution to enter the container; and
   a lifting component attached to the container, wherein:
   the lifting component attaches to the liquid flowing platform inside the container,
   the lifting component is configured to drive the liquid flowing platform to move along the cylindrical-shaped side wall of the container for defoaming the liquid solution when the liquid solution passes through the gap between the liquid flowing platform and the cylindrical-shaped side wall, and
   the lifting component is configured to rotate the liquid flowing platform by 90 degrees, around the longitudinal direction, inside the container while the liquid flowing platform is driven to move along the longitudinal direction of the cylindrical-shaped side wall.

2. The defoaming device according to claim 1, wherein the lifting component comprises a pulling rod, and a bottom plate positioned at one end of the pulling rod.

3. The defoaming device according to claim 1, further comprising a vacuum pump attached to the container wherein the container is a contained container and has a substantial vacuum space inside the container created by the vacuum pump.

4. The defoaming device according to claim 1, further comprising heating wires that are attached the container, wherein the heating wires are capable of heating the liquid solution inside the container to a certain temperature.

5. The defoaming device according to claim 4, wherein the heating wires are placed inside the liquid flowing platform.

6. The defoaming device according to claim 1, further comprising a solution stirrer that is placed inside the container, wherein the solution stirrer is capable of stirring the liquid solution inside the container for defoaming the liquid solution.

7. The defoaming device according to claim 1, wherein the liquid flowing platform has a conical surface, wherein the liquid flowing platform has a thickness that is gradually reduced from a center of the liquid flowing platform to an edge of the liquid flowing platform, and the gap is between the edge and the cylindrical -shaped side wall.

8. The defoaming device according to claim 7, wherein the conical surface of the liquid flowing platform comprises at least two sections, wherein one of the at least two sections has a wider gap than the other one of the at least two sections, and the two sections are used for defoaming different sizes of foams.

9. The defoaming device according to claim 1, further comprising two fixed positions for the liquid flowing platform, wherein two fixed positions are associated with the container and the liquid flowing platform is moved along the cylindrical-shaped side wall between the two fixed positions.

10. The defoaming device according to claim 9, wherein one of the two fixed positions is defined by a post that is placed inside the container and is attached to one end of the container, and the other one of the two fixed positions is defined by a sensor that is placed on the other end of the container, wherein the sensor is capable of detecting a moving position of the liquid flowing platform and is capable of instructing the lifting component to stop driving the liquid flowing platform to move.

11. A method of defoaming with the defoaming device according to claim 1, the method comprising:
    importing the liquid solution to be defoamed by the liquid flowing platform, wherein the liquid solution flows through the gap to a bottom of the container; and
    lifting the liquid solution by the lifting component when driving the liquid flowing platform to move along the cylindrical-shaped side wall of the container.

12. The method according to claim 11, further comprising rotating the liquid flowing platform by 90 degrees around the longitudinal direction inside the container while the liquid flowing platform is driven to move along the cylindrical-shaped side wall.

13. The method according to claim 11, further comprising sealing the container, and vacuuming the container by a vacuum pump.

14. The method according to claim 11, further comprising heating the liquid solution inside the container to a certain temperature by heating wires.

15. The method according to claim 11, further comprising stirring the liquid solution inside the container for defoaming the liquid solution by a solution stirrer.

* * * * *